Patented Nov. 10, 1925.

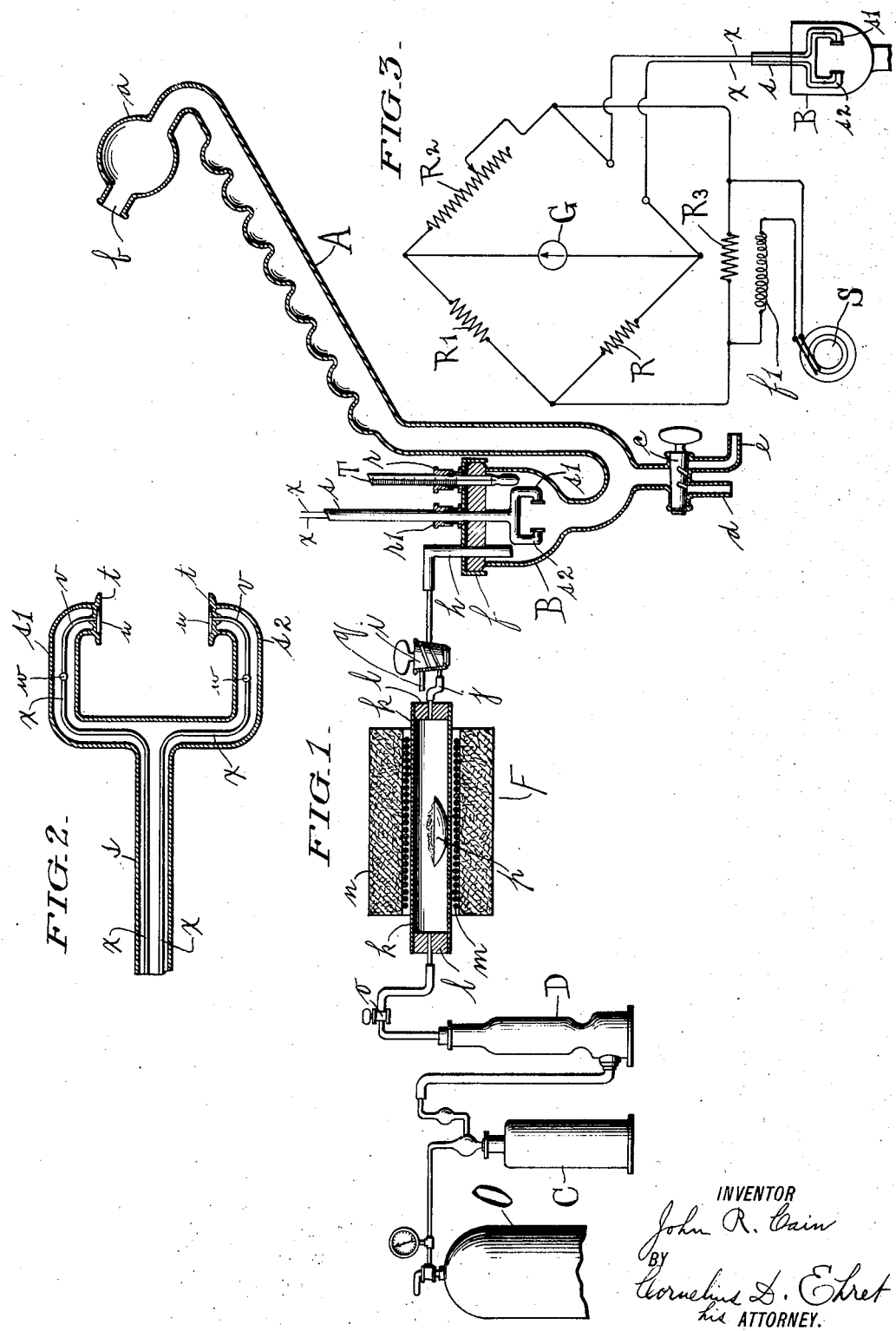

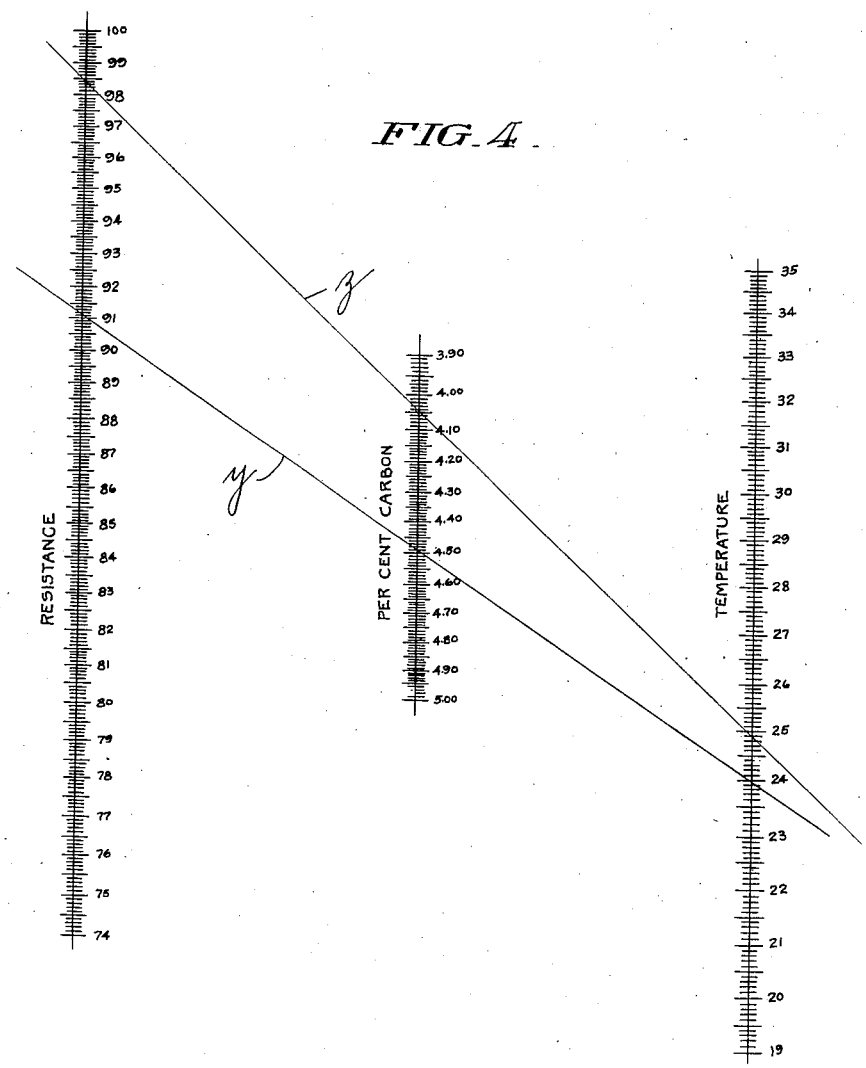

1,560,660

UNITED STATES PATENT OFFICE.

JOHN R. CAIN, OF WASHINGTON, DISTRICT OF COLUMBIA, DEDICATED TO THE PEOPLE OF THE UNITED STATES OF AMERICA.

GAS ANALYZING METHOD AND APPARATUS.

Application filed June 3, 1919, Serial No. 301,484. Renewed April 1, 1925.

*To all whom it may concern:*

Be it known that I, JOHN R. CAIN, a citizen of the United States, residing at Washington, D. C., have invented a new and useful Gas Analyzing Method and Apparatus, of which the following is a specification.

My invention relates to the determination of the quantity of a material, chemical element or compound existing by itself, or existent in or associated with another material, by causing such material, chemical or compound or some chemical product or conversion thereof to react with an electrolyte of known or predetermined resistance, with resultant change in resistance of electrolyte which, when determined, is a measure of the quantity of said material, chemical or compound.

More particularly my invention relates to such a determination of the amount of carbon in steel, alloy steel or metallic alloys, in rubber, in organic compounds such as dyes, explosives, etc., or for the determination of carbonate content of limestones, technical carbonates, etc., determination of carbon dioxide in flue gases, and analogous purposes.

For an understanding of my method and apparatus, and particularly one of many examples thereof, reference is had to the accompanying description and drawings, in which:

Fig. 1 is a representation of my apparatus, partly in section and partly in elevation, particularly suited for the determination of crabon in steel.

Fig. 2 is a fragmentary sectional view, on larger scale, of part of the electrolytic apparatus.

Fig. 3 is a diagram of one of the circuit arrangements utilizable in my invention.

Fig. 4 is an example of a chart utilizable with my apparatus.

Referring to Fig. 1, an absorption tube structure A, preferably of glass, communicates with the bulb $a$, open to the atmosphere at $b$ and communicates also with the cell B, for determining the electrical resistance or conductivity of electrolyte. The absorption tube structure communicates through the two way cock $c$ with the tubes $d$ and $e$ connected, respectively, by suitable tubing, not shown, with a receptacle for waste or used solution and to a suitable reservoir of fresh or unused electrolyte solution. The cell B is closed, air-tight, by a cap $f$, the cap structure being held to the cell B by any suitable clamping structure, not shown. Through the cap structure extends the tube $h$, communicating with the two way cock $i$, one branch of which communicates through the tube $j$ with the interior of the porcelain or other refractory tube $k$, of an electric furnace F. Tube $k$ is closed at each end by the air-tight removable plugs $l$, $l$. Surrounding the tube $k$ is the wire or other suitable resistor $m$ surrounded by a lagging or material of poor heat conductivity $n$, the conductor $m$ being connected in circuit with a source of current and regulable rheostat, not shown, whereby the wire is brought to any suitable temperature, which is communicated to the interior of the refractory tube $k$.

O is a tank of oxygen under pressure from which oxygen may be delivered in succession through the bubble counting tube C and the soda lime tower D, between which latter and the interior of the furnace tube $k$ intervenes a suitable cock $o$.

Within the tube $k$ may be placed a boat $p$ of nickel or other suitable material containing alundum or other refractory sand or finely divided material upon which may be laid the sample of steel or other material, a content of which is to be subjected to oxygen at high temperature.

The remaining branch $q$ from the stop cock $i$ may connect with a source of air or other suitable clearing out gas or vapor under pressure.

Extending through the cover structure $f$ of the cell B, as through a gland or stuffing box $r$, is a thermometer T, whose bulb is subjected to the temperature of the electrolyte in the cell B. Extending through the cover structure $f$ through a similar stuffing box or gland $r'$ is a tube $s$ of glass or other suitable material having at its lower end the branches $s^1$ and $s^2$ terminating in inwardly turned opposing ends having the faces $t$, $t$ in each of which is embedded a small plate or disk $u$ of platinum or other suitable material with each of which is connected a platinum or other suitable wire $v$ sealed through the glass backing of the plate or disk $u$ and welded, soldered or otherwise electrically connected at $w$, $w$ with the copper or other suitable wires $x$, $x$, which extend upwardly and out of electrical contact with each other through the stem $s$ to a Wheatstone bridge, Fig. 3, in one arm of which the conductors $x$, $x$ and therefore the electrolyte between the plates or disks $u$, $u$ are connected in series. By loosening the nut of stuffing box $r^1$ the glass tube $s$ carrying $s^1$ and $s^2$ may be moved up or down until a predetermined resistance, varying with the electrolyte used, is obtained. When this position is ascertained for any given electrolyte, the nut of the stuffing box may be again tightened and if necessary the tube $s$ further secured in position by cementing with wax. In other arms of the bridge are connected resistances R and $R^1$, which may be fixed resistances, and which may be of equal magnitudes. In the remaining arm of the bridge is the adjustable resistance or dial rheostat $R^2$. In one of the conjugate conductors of the bridge is connected a resistance $R^3$ in shunt to which are serially connected with each other the field winding $f^1$ of the galvanometer G and the source or generator S of alternating or fluctuating current of any suitable character, as well understood to be utilizable in the measurement of resistances of electrolytes. In another of the conjugate conductors of the bridge is connected, as indicated at G, the remaining winding or coil of the galvanometer, which may be of any suitable alternating or fluctuating current type.

The principle of my method and operation of my apparatus, particularly as to measurement of carbon content of steel, is as follows:

A suitable quantity, for example 200 c. c. of suitable electrolyte, for example aqueous solution of barium hydroxide, of suitable strength, or concentration, is introduced from a reservoir through the cock $c$ into the absorption tube structure, the electrolyte rising and filling the cell B and extending also into the ascending branch to the right of said cell, the system being free or freed of all carbon dioxide from the air or any other source to prevent reaction thereof with the electrolyte. A predetermined or initial resistance of the electrolyte may be obtained by vertical movement of the members $s^1$ and $s^2$ within the cell B, as by loosening the gland $r^1$ and raising or lowering the stem to a suitable position and then again tightening the gland $r^1$. The platinum or other disks or plates $u$, $u$ are now held in predetermined position in the electrolyte and the resistance thereof between the disks $u$, $u$ is found by adjusting the rheostat $R^2$ of the Wheatstone bridge until the galvanometer G shows a zero deflection, the resistance in the arm containing the electrolyte being then read or determined in well known manner. At the same time the temperature of the electrolyte is read upon the thermometer T.

The boat $p$ and the alundum or other sand therein are preheated, as in the furnace F, to any suitable temperature, as 500 to 600 degrees C., whereupon the sample of steel, for example, 2 grams thereof, is placed upon the sand and the boat reintroduced into the tube $k$, which is then connected up with the apparatus as indicated in Fig. 1, and the temperature raised to suitable degree, for example, 1050 degrees to 1100 degrees C. The cock $o$ is opened and oxygen is admitted from O through the tower D and bubble counting device C into the tube $k$ and through the same and the cock $i$ through the tube $h$ into the electrolyte within the cell B. The rate of passage of oxygen is suitably adjusted or determined and may be, for example, at the rate of 300 to 400 c. c. per minute; and continued for a suitable time, for example, 1½ minutes. The action of the oxygen upon the heated steel is to burn all the carbon contained therein to carbon dioxide, which is carried along with the oxygen into the cell B where it is passed through the electrolyte therein, the carbon dioxide reacting with the barium hydroxide to produce barium carbonate, which is precipitated, the oxygen continuing on through the absorption apparatus and escaping to the atmosphere at $b$. All of the carbon dioxide is absorbed or converted by the barium hydroxide into carbonate, the chemical reaction being accompanied by a change in the resistance of the electrolyte whose temperature and resistance are again measured.

The net change in resistance of the electrolyte, after taking into consideration the resistance change due to any temperature change, is a measure of the amount of carbon dioxide and therefore a measure of the carbon content of the steel.

For convenience in applying necessary temperature corrections and in correlating resistance and percentages of carbon, there may be employed a chart, such as shown in Fig. 4, in which the left hand scale reads in units of resistance of the electrolyte, the right hand scale in temperatures of the electrolyte and the middle scale in percentages of carbon in the steel. This chart is constructed from the equations to the curves showing the relations, respectively, between resistance and concentration of electrolyte, or related quantity, and resistance and temperature. Such curves and chart vary with the electrolyte and other conditions and have to be constructed experimentally for each case.

A straight edge is laid across the chart intersecting the resistance scale at the initial value to which the resistance of the electrolyte between the plates $u$, $u$ has been adjusted by adjusting their vertical position in cell B, and intersecting the temperature scale at the temperature of the electrolyte when its initial resistance was taken or adjusted. This will give a certain percentage reading upon the middle scale, which reading, however, is valueless until the second reading of temperature and the resistance of the electrolyte is taken after passage of the carbon dioxide through the barium hydroxide. A straight edge is then again laid across the chart intersecting the resistance and temperature scales at the resistance and temperature values of the second observation. The straight edge will intersect the per cent carbon scale at a different point from the first intersection, and the difference between the two readings upon the middle scale will then give, after multiplying by a factor proportional to the weight of the sample taken, the percentage of carbon in the steel.

One example of the two positions of the straight edge is indicated in Fig. 4 by the two lines $y$ and $z$.

The second observation of resistance and temperature may be taken as the initial measurement of resistance and temperature for a subsequent determination of a succeeding sample of steel.

When the electrolyte becomes exhausted so far as concerns its capacity to react with the material delivered thereto, it may be drawn off to a waste receiver through the cock $c$ and refilled as described.

To insure that all the carbon dioxide formed is delivered to the electrolytic apparatus, after burning of the carbon in the steel within the furnace F, the cock $i$ may be turned to cause admission of air through the tube $q$, the air being then blown through the tube $h$ carrying any carbon dioxide that may be lodged therein into and through the electrolyte, so that all carbon dioxide produced is caused to react with the electrolyte and thus insure a correct determination.

The percentage of carbon dioxide in flue gas may similarly be determined by passing a known quantity of the flue gas through the tube $h$, the carbon dioxide reacting as above described and changing the resistance of the electrolyte, which resistance change is a measure of the quantity of carbon dioxide present.

Similarly, carbon dioxide produced from the carbon in rubber, in organic compounds such as dyes, explosives, etc., as well as the carbon or carbonate in limestones, technical carbonates, etc., may be determined.

My method and apparatus are also available in connection with analyses of products of combustion from internal combustion engines, exhaust gases from blast furnaces, cement kilns, lime or other kilns, and in general all waste gases or liquids from chemical or metallurgical operations where a gaseous, solid or liquid substance is present capable of changing the resistance of an electrolyte; and also for determination of the salts ar gases in boiler, mineral, effervescent or other waters.

It will be understood that my invention comprehends the introduction into a suitable electrolyte of other materials than carbon dioxide, and may be, in fact, any other material which will react with any suitable electrolyte in such manner as to change its resistance, which then becomes a measure of the quantity of the introduced reagent.

It will accordingly be understood that my invention is not limited to the foregoing disclosure.

What I claim is:

1. The method of determining the quantity of a material in a mixture which consists in determining the resistance of an electrolyte adapted to react with said material to produce a precipitate, introducing said mixture into the electrolyte and effecting a change in resistance thereof by reaction therewith, and determining the quantity of said material by said change in resistance.

2. The method of determining the quantity of a gas in a gaseous mixture, which consists in measuring the resistance of an electrolyte capable of chemical reaction with said gas to form a precipitate, introducing said mixture to react with the electrolyte and change its resistance, again measuring the resistance of said electrolyte in the absence of the precipitate, and determining the quantity of said material by the change in resistance.

3. The method of determining the quantity of a material, which consists in adjusting electrodes in an electrolyte capable of chemical reaction with said material until a predetermined electrolyte resistance obtains between said electrodes, introducing said material to react with the electrolyte and change its resistance, measuring the resistance of said electrolyte between said electrodes, and determining the quantity of said material by the change in resistance.

4. The method of determining the quantity of a material, which consists in adjusting electrodes in an electrolyte capable of chemical reaction with said material until a predetermined electrolyte resistance obtains between said electrodes, measuring the temperature of said electrolyte, introducing said material to react with said electrolyte and change its resistance, measuring the temperature of said electrolyte and its resistance between said electrodes, and determining the quantity of said material by the change in resistance corrected with respect to the temperature change of the electrolyte.

5. The method of quantitatively determining carbon dioxide, which consists in passing the same into an electrolyte, as barium hydroxide, to react therewith and produce a change in resistance thereof, determining the change of resistance of the electrolyte, and from said change of resistance determining the quantity of carbon dioxide.

6. The combination with absorption tube structure having a cell adapted to contain electrolyte, of means associated therewith for measuring resistance of the electrolyte, and means for passing into said electrolyte material whose quantity is to be determined.

7. The combination with absorption tube structure having a cell adapted to contain electrolyte, of a closure for said cell, conducting members spaced from each other in said cell and connected to conductors extending to the exterior through said closure, resistance measuring apparatus with which said conductors communicate, and means for passing through said closure material whose quantity is to be determined and adapted to change the resistance of the electrolyte.

8. The combination with absorption tube structure having a cell adapted to contain electrolyte, of a closure for said cell, conducting members spaced from each other in said cell and connected to conductors extending to the exterior through said closure, resistance measuring apparatus with which said conductors communicate, means for passing through said closure material whose quantity is to be determined and adapted to change the resistance of the electrolyte, and means for measuring the temperature of the electrolyte.

9. The combination with absorption tube structure having a cell adapted to contain electrolyte, of a closure for said cell, conducting members spaced from each other in said cell and connected to conductors extending to the exterior through said closure, resistance measuring apparatus with which said conductors communicate, means for passing through said closure material whose quantity is to be determined and adapted to change the resistance of the electrolyte, and temperature measuring means extending into said cell through said closure.

10. The combination with a closed tube, of means for raising the temperature thereof, means for passing through said tube while heated material adapted to react with material contained in said tube, absorption tube structure having a cell adapted to contain electrolyte, means associated therewith for measuring resistance of the electrolyte, and means for delivering into said electrolyte the products of reaction in said tube.

11. The combination with a container adapted to hold electrolyte, of electrodes spaced from each other in the electrolyte, means for adjusting said electrodes to vary the resistance of the electrolyte between them, means for measuring said resistance, and means for passing into said electrolyte a material adapted to react therewith to change its resistance and representative of a quantity of material to be determined.

12. The combination with a container adapted to hold electrolyte, of electrodes spaced from each other in said electrolyte, a support for said electrodes adjustable to effect different emersions of them, means for measuring the resistance of electrolyte between said electrodes, and means for passing into said electrolyte a material adapted to react therewith to change its resistance and representative of a quantity of material to be measured.

13. The combination with a container adapted to hold electrolyte, of electrodes spaced from each other in said electrolyte, a support for said electrodes adjustable to effect different emersions of them, means for measuring the resistance of electrolyte between said electrodes, means for measuring the temperature of the electrolyte, and means for passing into said electrolyte a material adapted to react therewith to change its resistance and representative of a quantity of material to be determined.

14. The combination with absorption tube structure having a cell adapted to contain electrolyte, of a closure for said cell, electrodes spaced from each other, a support for said electrodes extending through said closure and adjustable to different heights with respect thereto, means for measuring the resistance of electrolyte between said electrodes, and means for passing into said electrolyte a material adapted to react therewith to change its resistance and representative of a quantity of material to be determined.

15. The combination with absorption tube structure having a cell adapted to contain electrolyte, of a closure for said cell, electrodes spaced from each other, a support for said electrodes extending through said closure and adjustable to different heights with respect thereto, means for measuring the resistance of electrolyte between said electrodes, means for measuring the temperature of said electrolyte, and means for passing into said electrolyte a material adapted to react therewith to change its resistance and representative of a quantity of material to be determined.

16. The combination with a cell adapted to contain electrolyte, of tube structure communicating with said cell and comprising an upwardly extending portion terminating at a height above said cell, means for introducing and withdrawing electrolyte from said cell through different paths, electrodes spaced from each other in said cell, means for measuring the resistance of electrolyte between said electrodes, and means for delivering into the electrolyte a material adapted to react therewith to change its resistance and representative of a quantity of material to be determined.

17. The combination with apparatus for measuring resistances and temperatures of electrolyte, of means for introducing a quantity of material adapted to react with electrolyte to produce a change of resistance thereof, means for evaluating the quantity of said added material comprising a chart consisting of resistance and temperature scales respecting the electrolyte employed, and a third scale reading in terms of the quantity of said added material, said scales being so related that the difference between the readings on said third scale between intersections thereof by lines passing through the initial and final temperature and resistance values on the other scales is the value of the quantity of said added material.

18. The method of determining the quantity of a material, which consists in measuring the resistance and temperature of an electrolyte capable of chemical reaction with said material, introducing said material to react with the electrolyte and change its resistance, again measuring the resistance and temperature of said electrolyte, and evaluating the quantity of said material by taking the difference between readings on a scale between intersections thereof by lines intersecting correlated scales of resistances and temperatures respecting said electrolyte.

19. The method of determining the quantity of carbon dioxide in a gaseous mixture which comprises passing the mixture thru an electrolyte which is reactive with carbon dioxide, and determining the quantity of carbon dioxide from the change in resistance of said electrolyte.

20. Apparatus for quantitative determination of materials comprising a container for electrolyte solution, electrode structure comprising a support and electrodes carried by said support, said electrode support being adjustable with respect to said container whereby the immersion of said electrodes in the solution is adjustable, and means for delivering into said container material for changing the resistance of the electrolyte.

21. Apparatus for quantitative determination of materials comprising a container for electrolyte solution, an absorption tube communicating with the bottom of said container and extending above the same, a closure for said container, electrodes in said container, means for introducing through said closure material for reacting with said electrolyte to change its resistance, and means for introducing electrolyte while said closure is in position.

22. Apparatus for quantitative determination of materials comprising a container for electrolyte solution, an absorption tube communicating with said container below the top thereof and extending above said container, means for introducing and withdrawing electrolyte from said container, a closure for said container, and electrodes supported by said closure and immersed in the solution.

23. Apparatus for quantitative determination of materials comprising a container for electrolyte solution, a gas-tight closure therefor, electrodes in said container, a support for said electrodes extending through a gas-tight joint in said closure, and means for measuring the resistance of the electrolyte between said electrodes.

24. Apparatus for quantitative determination of materials comprising a container for electrolyte solution, a gas-tight closure therefor, electrodes in said container, a support for said electrodes extending through a gas-tight joint in said closure, and means for introducing gas into said electrolyte through said closure.

25. Apparatus for quantitative determination of materials comprising a container for electrolyte solution, electrodes, a common support therefor, connections from said electrodes extending through said support, and a closure for said receptacle through which said support extends.

26. The method of quantitatively determining carbon dioxide, which consists in passing the same into a solution of electrolyte of such character as to react therewith to produce a precipitate for effecting a change in resistance of said electrolyte solution, and determining the quantity of carbon dioxide from the magnitude of change in resistance of said electrolyte solution.

In testimony whereof I have hereunto affixed my signature this 3d day of June, 1919.

JOHN R. CAIN.